United States Patent
Shepherd et al.

[15] 3,660,218
[45] May 2, 1972

[54] HYDROPHILIC POLYMER CONTAINING SYNTHETIC LEATHER

[72] Inventors: Thomas H. Shepherd, Hopewell; Ezekiel J. Jacob, Brooklyn, both of N.Y.

[73] Assignee: National Patent Development Corporation, New York, N.Y.

[22] Filed: Oct. 15, 1968

[21] Appl. No.: 768,616

[52] U.S. Cl. ..................161/87, 156/83, 156/154, 156/246, 161/89, 161/162, 161/164, 161/170, 161/DIG. 2
[51] Int. Cl. ..................................................B32b 5/16
[58] Field of Search.................161/88, 162, 168, 169, 170, 161/87, 89, 164; 260/34.2, 859, 899; 117/140 R, 161 KP

[56] References Cited

UNITED STATES PATENTS

| | | | |
|---|---|---|---|
| 2,668,787 | 2/1954 | Schramm | 161/88 |
| 3,117,941 | 1/1964 | Knoblock et al. | 260/899 |
| 3,190,850 | 6/1965 | Burke, Jr. | 260/38 |
| 3,220,960 | 11/1965 | Wichterle et al. | 260/29.6 H |
| 3,345,434 | 10/1967 | Griffith | 260/899 |
| 3,472,798 | 10/1969 | Pitchforth et al. | 117/161 KP |
| 3,503,784 | 3/1970 | Morita et al. | 117/140 R |

Primary Examiner—Robert F. Burnett
Assistant Examiner—Linda C. Koeckert
Attorney—Cushman, Darby & Cushman

[57] ABSTRACT

A breathable leather substitute is prepared by dispersing particles of a hydrophilic acrylate or methacrylate polymer through a sheet of a polyurethane and/or vinyl chloride polymer, laminating the sheet to a woven or non-woven fabric and heating the product to swell the hydrophilic polymer particles. The particles on the surface of the sheet are then broken by running the laminate through a sander to give a suede-like finish.

16 Claims, 4 Drawing Figures

PATENTED MAY 2 1972   3,660,218

INVENTORS
THOMAS H. SHEPHERD
EZEKIEL J. JACOB

BY Cushman, Darby & Cushman
ATTORNEYS

HYDROPHILIC POLYMER CONTAINING SYNTHETIC LEATHER

The present invention relates to a vapor permeable leather substitute.

A number of materials have been employed in the past as substitutes for leather. However, none have proven completely satisfactory. Thus, many of them do not have adequate moisture vapor transmission properties. Others do not have adequate resistance to surface damage. Thus scuffing a shoe upper destroys the efficacy of known synthetic leathers. Another disadvantage of many poromeric materials is that the man-made fibers used in their substrates repel rather than absorb water. This accounts for the discomfort of "hot" feet among some wearers of shoes made from poromeric leather substitutes.

Accordingly, it is an object of the present invention to develop a leather substitute which has good moisture vapor transmission properties.

Another object is to prepare an improved poromeric product.

A further object is to develop a scuff resistant, vapor permeable leather substitute.

An additional object is to reduce or eliminate the problem of repelling water occurring in substrates made from man-made fibers and employed in the manufacture of shoes.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing a sheet or film of a binder polymer having dispersed therethrough particles of a hydrophilic acrylate or methacrylate. This sheet can then be united to a woven or non-woven fabric (substrate) to make a leather substitute useful in preparing shoes, upholstery, luggage, apparel, e.g. hand bags and gloves, wall coverings, bar coverings, clothing, e.g. leather jackets, coats and dresses. The products are particularly useful as shoe uppers. It is critical that hydrophilic acrylate or methacrylate polymers be employed since other hydrophilic polymers do not work.

The hydrophilic acrylate or methacrylate polymer is preferably of the solvent soluble type since such products have substantially superior moisture vapor transmission properties. There can be employed, however, cross-linked hydrophilic acrylates and methacrylates.

The hydrophilic monomer employed is a hydroxy lower alkyl acrylate or methacrylate, hydroxy lower alkoxy lower alkyl acrylate or methacrylate, e.g. 2-hydroxyethyl acrylate, 2-hydroxyethyl methacrylate, diethylene glycol monomethacrylate, diethylene glycol monoacrylate, 2-hydroxypropyl acrylate, 2-hydroxypropyl methacrylate, 3-hydroxypropyl acrylate, 3-hydroxypropyl methacrylate, dipropylene glycol monomethacrylate. The preferred monomer for forming the polymer is 2-hydroxyethyl methacrylate.

When cross-linked or cross-linkable hydrophilic polymers are prepared normally, the cross-linking agent is preferably present in an amount of 0.1 to 2.5 percent, most preferably 0.1 to 1.0 percent, of the total monomers, although up to 15 percent of cross-linking agent can be used. Typical examples of cross-linking agents include ethylene glycol diacrylate, ethylene glycol dimethacrylate, 1,2-butylene dimethacrylate, 1,3-butylene dimethacrylate, 1,4-butylene dimethacrylate, propylene glycol diacrylate, propylene glycol dimethacrylate, diethylene glycol dimethacrylate, dipropylene glycol diacrylate, divinyl benzene, divinyl toluene, diallyl tartrate, allyl pyruvate, allyl malate, divinyl tartrate, triallyl melamine, N,N'-methylene-bis-acrylamide, glycerine trimethacrylate, diallyl maleate, divinyl ether, diallyl monoethylene glycol citrate, ethylene glycol vinyl allyl citrate, allyl vinyl maleate, diallyl itaconate, ethylene glycol diester of itaconic acid, divinyl sulfone, hexahydro-1,3,5-triacryltriazine, triallyl phosphite, diallyl ester of benzene phosphonic acid, polyester of maleic anhydride with triethylene glycol, polyallyl sucrose, polyallyl glucose, e.g. diallyl sucrose and triallyl glucose, sucrose diacrylate, glucose dimethacrylate, pentaerythritol diacrylate, sorbitol dimethacrylate.

Acrylamide, methacrylamide polymers are too water soluble to be employed alone. However, there can be employed acrylate or methacrylate polymers containing up to 30 percent of acrylamide or methacrylamide, e.g. a copolymer of 85 percent 2-hydroxyethyl methacrylate and 15 percent acrylamide. Cross-linked polymers can be employed of acrylamide with sufficient cross-linking agent, e.g. 2 percent, to render the product water insoluble.

As catalysts for carrying out the polymerization there is employed free radical catalyst in the range of 0.05 to 1 percent of the polymerizable hydroxyalkyl ester. For example, the preferred amount of catalyst is 0.1 to 0.2 percent of the monomer. Typical catalysts include $t$-butyl peroctoate, benzoyl peroxide, isopropyl percarbonate, methylethylketone peroxide, cumene hydroperoxide and dicumylperoxide. Irradiation, e.g., by ultra violet light or gamma rays, also can be employed to catalyze the polymerization. Polymerization can be done at 20° to 150° C., or even up to 235° C., usually 40° to 90° C.

When cross linked polymers are prepared the method of polymerization is not critical and the monomers can be polymerized in water, by suspension polymerization, in organic solvent or without any solvent. However, when hydrophilic soluble thermoplastic polymers are desired they are preferably prepared by suspension polymerization of the hydrophilic monomers in a non-polar medium such as silicone oil, mineral oil, xylene, toluene, benzene or the like. Alternatively they can be polymerized while in solution in ethyl alcohol, methyl alcohol, propyl alcohol, isopropyl alcohol, formamide, di-methyl sulfoxide or other appropriate solvent.

In the suspension polymerization procedure the catalyst containing monomer is dispersed in the non-polar medium in the form of small droplets which are polymerized to form finely divided spheres or beads. The beads are dissolved in the polar organic solvents, e.g., ethyl alcohol, isopropyl alcohol, ethyl alcohol-water (e.g. 95:5 or 70:30), glycols and glycol ethers, e.g. diethylene glycol, ethylene glycol, propylene glycol, ethylene glycol monoethyl ether, for use as sprays, etc.

Suspension polymerization is preferably carried out at 50°-105° C. until bead formation is completed. The ratio of suspension oil to monomer can be varied widely, but preferably is from 5:1 to 20:1. As stated, the catalyst to monomer ratio is desirably from 0.05 to 1.0 parts per 100 parts of monomer.

The hydrophilic polymer particles are normally employed in a particle size of 50 mesh or below, such as 80 mesh, (U.S. Standard Sieve Series), but preferably are 100 mesh or below. There is no minimum particle size, e.g. the particles can be 325 mesh or even as small as 1 micron or below. The finely divided particles can be prepared directly during the polymerization, e.g. by suspension polymerization, or they can be formed by grinding or otherwise breaking up larger particles of the polymer, e.g. by grinding or otherwise crushing a cast block of the hydrophilic polymer.

The finely divided particles of hydrophilic polymer are intimately mixed with a flexible thermoplastic polymer binder material, e.g. in a mill, and then formed into a film or sheet in any convenient fashion, most preferably by calendering. The film or sheet can have a thickness of as little as 2 mils but is usually 5 to 50 mils or even more. As a result of the calendering operation, there is formed a sheet of the thermoplastic polymer binder as a matrix having dispersed therethrough a myriad of particles of the hydrophilic polymer. The hydrophilic polymer is usually employed in an amount of 40 to 150 phr, where phr stands for per hundred parts of binder.

Unless otherwise indicated, all parts and percentages are by weight.

Of course there can be included in the composition conventional plasticizers, stabilizers, fire retardants, dyes, pigments and the like, normally included in resin formulations. As pigments, for example, there can be used carbon black, titanium dioxide (white), aluminum flake (for reflective fabrics), ochre, phthalocyanines, iron oxides, cadmium red, etc.

As the thermoplastic polymer for forming the film or sheet, there is preferably employed a polyurethane or a vinyl chloride polymer or mixtures thereof, (e.g. 65:35 or 50:50). However, there can be used other flexible thermoplastic polymers such as nitrocellulose, cellulose acetate, cellulose acetate-propionate, polyesters, e.g. polyethylene terephthalate, polyvinyl butyral, ethylene-vinyl acetate copolymer (e.g. 80:20), polyacrylonitrile, acrylonitrile-vinyl chloride copolymer (85:15), rubbers such as natural rubber and synthetic rubbers including butadiene-styrene copolymer (e.g. 60:40 or 75:25), butyl rubber (e.g. isobutylene-butadiene (98.5:1.5) and other butyl rubbers such as those set forth in Thomas U.S. Pat. No. 2,356,128), polychloroprene, ethylene-propylene terpolymers (e.g. ethylene-propylene-norbornadiene 60:35:5 or ethylene-propylene-1,5-hexadiene 65:32:3), butadiene-acrylonitrile (65:35). After forming the sheet, the vulcanizable materials such as the natural and synthetic rubbers can be vulcanized, e.g. if a vulcanizing agent is included in the original mix.

As vinyl chloride polymers there can be employed polyvinyl chloride, vinyl chloride-vinyl acetate copolymer (e.g. 95:5 or 87:13), vinyl chloride-vinylidene chloride (95:5), vinyl chloride-ethyl acrylate (95:5) or the like. The vinyl chloride polymers can be plasticized or unplasticized. When a plasticizer is employed it is conventionally used in an amount of 40 to 150 parts per 100 parts of vinyl chloride polymer. Typical plasticizers include dioctyl phthalate, octyl diphenyl phosphate, dioctyl azelate, dioctyl adipate, butyl phthalyl butyl glycolate, polyethylene glycol adipate, trioctyl phosphate, dicyclohexyl phthalate, dicapryl phthalate, hydrogenated terphenyl. If the vinyl chloride polymer is employed as a plastisol, the hydrophilic polymer particles can simply be dispersed in the plastisol and the film or sheet formed by fluxing the plastisol with heat.

The polyurethanes employed are preferably essentially linear. Polyester urethanes and polyalkylene ether urethanes can be employed. The particular polymers, polyurethane (or vinyl chloride polymers) employed to prepare the hydrophilic acrylate or methacrylate polymer-containing sheet are not a part of the invention. Thus, the thermoplastic polyurethanes are known to the art, e.g. see Schollenberger U.S. Pat. No. 2,871,218, Muller U.S. Pat. No. 2,729,618, Schollenberger U.S. Pat. No. 2,899,411, Kessler U.S. Pat. No. 2,959,570, Scott U.S. Pat. No. 3,001,971, Johnston U.S. Pat. No. 3,000,757, Schollenberger U.S. Pat. No. 3,015,650, Holden U.S. Pat. No. 3,100,721, Holden U.S. Pat. No. 3,208,875 and Murphy U.S. Pat. No. 3,296,016. There can be used any of the polyurethanes (including the polyureas) described in those patents.

The thermoplastic polyurethanes employed in the present invention normally have molecular weights of at least 10,000 and generally of 20,000 or more. The molecular weight can be 50,000 or over, e.g. 100,000, 200,000 or 300,000.

The thermoplastic polyurethanes employed in the present invention are prepared by reacting (1) a diisocyanate such as hexamethylene diisocyanate, diphenyl methane p,p'-diisocyanate, dichlorodiphenyl methane diisocyanate, dimethyl diphenyl methane diisocyanate, diphenyl dimethyl methane diisocyanate, 4,4'-bibenzyl diisocyanate, diphenyl ether diisocyanate, 3,3'-dichlorodiphenyl-4,4'-diisocyanate, naphthylene-1,5-diisocyanate, tetramethylene diisocyanate, thiodipropyl diisocyanate, p-phenylene diisocyanate, 2,4-tolylene diisocyanate, tetrachloro p-phenylene diisocyanate, tetrachloro-m-phenylene diisocyanate, dianisidine diisocyanate, benzidine diisocyanate, 3,3'-benzidine diisocyanate, durene diisocyanate and bitolylene diisocyanate with (2) a long chain dihydric alcohol such as polytetramethylene glycol molecular weight 4,000 or polypropylene glycol molecular weight 2,025 or 4,000 or 10,000 or polyethylene glycol molecular weight 4,000 or 10,000 or with an essentially linear polyester made by reacting a glycol, e.g. a glycol containing two to 10 carbon atoms such as butanediol 1,4, hexamethylene diol-1,6, octamethylene diol-1,8, decamethylene diol-1,10, ethylene glycol, trimethylene glycol, propylene glycol, quinitol, hexahydropyrocatechol, 1,3-butylene glycol, thiodiglycol, diethylene glycol, dipropylene glycol, 2-methyl-1,3-propanediol, 2-propyl-1,4-butanediol, 2-methyl-1,5-pentane diol, neopentyl glycol, 2-methyl-1,5-pentanediol, with a dicarboxylic acid such as adipic acid, succinic acid, pimelic acid, suberic acid, azelaic acid, sebacic acid, malonic acid, methyl adipic acid, maleic acid, dihydromuconic acid, thiodipropionic acid, phthalic acid, isophthalic acid, terephthalic acid and hexahydrophthalic acid. The anhydrides, e.g. succinic anhydride and phthalic anhydride can be employed (when they exist) to form the polyester. The preferred dicarboxylic acids are alkanedioic acids of four to 10 carbon atoms. The polyester employed for reaction with the diisocyanate has free terminal hydroxyl groups. It is frequently desirable to add free glycol, e.g. ethylene glycol, propylene glycol, decamethylene glycol or butanediol-1,4 along with the diisocyanate.

One preferred class of polyurethanes which can be used according to the invention is the essentially linear polyesterurethane elastomer characterized by being thermoplastic, extrudable, moldable, molten at elevated temperatures, substantially free of cross-links and substantially soluble in dimethyl formamide comprising the reaction product obtained by heating a mixture comprising as essential polyester urethane forming ingredients (1) one mole of an essentially linear hydroxyl terminated polyester of a saturated, aliphatic glycol having from four to 10 carbon atoms and having hydroxyl groups on its terminal carbon atoms and a material selected from the group consisting of a dicarboxylic acid of the formula HOOCROOOH where R is an alkylene radical containing from two to eight carbon atoms and its anhydride, said polyester having an average molecular weight between 600 and 1,200 and having an acid number less than 10 and (2) from about 1.1 to 3.1 moles of a diphenyl diisocyanate having an isocyanate group on each phenyl nucleus in the presence of (3) from about 0.1 to 2.1 moles of a saturated, aliphatic free glycol containing four to 10 carbon atoms and having hydroxyl groups on its terminal carbon atoms, the molar amount of said polyester and said free glycol combined being essentially equivalent to the molar amount of said diphenyl diisocyanate whereby there are essentially no unreacted groups of the class consisting of isocyanate and hydroxyl groups in said reaction products. Such polyesterurethanes have molecular weights above 10,000.

Polyesterurethanes of the above preferred class are those set forth in Schollenberger U.S. Pat. No. 2,871,218.

An example of such a material is the product made from a mixture of 1,447 grams of hydroxyl poly (tetramethylene adipate) molecular weight 849, hydroxyl number 130.4, acid number 0.89 and 109.6 grams of butanediol-1,4 melted in a kettle and stirred for 20 minutes at 5–6 mm. at 100° to 110° C. followed by the addition of 730 grams of diphenyl methane p,p'-diisocyanate with further heating at 140° C. for 3.5 hours. This product is called hereinafter polyesterurethane A. It has a molecular weight well above 10,000.

Another suitable polyesterurethane is made in similar fashion by melting 2,323 grams of hydroxyl poly (tetramethylene adipate), molecular weight 1,019, hydroxyl number 106.1, and 219.52 grams of butanediol-1,4 and stirring for 15 minutes at 10 mm. and 100° to 105°C. followed by addition of 1178.7 grams of diphenyl methane p,p'-diisocyanate and heating for 3 hours at 140°C. This product, which also has a molecular weight above 10,000, is identified as polyesterurethane B.

Another class of polyesterpolyurethanes is the product obtained by reacting an anhydrous organic linear polyester having from 0.64 to 2.4 percent by weight of hydroxyl groups and an acid value substantially not exceeding 1, said polyester being made from an aliphatic polymethylene dicarboxylic acid and a polymethylene glycol, with an organic diisocyanate whose sole reactive groups are isocyanate groups, in an excess of from 20 to 250 percent over the amount which is necessary to combine with said hydroxyl groups and then reacting the isocyanate modified polyester thus formed with a compound of the general formula $R_1(OH)_2$ having a molecular weight not exceeding 800, wherein $R_1$ is a radical selected from the group consisting of a divalent hydrocarbon radical and a divalent radical in which the carbon chain is interrupted by a member of the group consisting of —O—, —N—, —S—, —SO$_2$ in such a proportion that the excess of isocyanate groups therein is reduced to at most zero. Preferably, $R_1(OH)_2$ is a polymethylene glycol.

As example of a material within the second class of materials is the product obtained by mixing 250 parts by weight of propylene glycol adipic acid polyester having an OH content of 1.25 percent and a COOH content of 0.12 percent, 250 parts by weight of ethylene glycol adipic acid polyester having an OH content of 1.67 percent and a COOH content of 0.10 percent, evacuating at 130° C. for 20 minutes at the water pump, adding 0.13 part by volume of concentrated hydrochloric acid, evacuating again for 30 minutes at the water pump, adding 80 parts by weight of naphthylene-1,5 diisocyanate and allowing the reaction to continue for 7 minutes, evacuating again, adding 12.5 parts by weight of quinite and casting upon a plate heated to 100° C. The mixture is heated at 100° C. for 4 hours. This product is called hereinafter polyesterurethane C and has a molecular weight above 50,000.

There can be employed any of the linear polyesterurethanes prepared in the examples of Muller U.S. Pat. No. 2,729,618.

Another suitable polyesterurethane is the product prepared from 0.1 mole of hydroxyl poly (neopentylene isophthalate) molecular weight 800, acid number about 1, 0.07 mole of neopentyl glycol and 0.17 mole of m-phenylene diisocyanate prepared in example 1 of Schollenberger U.S. Pat. No. 3,015,650.

A preferred class of polyether urethane elastomers may be prepared by reacting (1) one mole of an essentially linear dihydric alcohol such as polypropylene glycols (molecular weight 400 to 4,000), polypropylene-polyethylene glycols (block copolymers) of molecular weight 1,000–3,000 or polytetramethylene glycol (molecular weight 1,000–4,000) with (2) from 1.1 to 3.1 moles of a diphenyl diisocyanate having an isocyanate group on each phenyl nucleus in the presence of (3) 0.1 to 2.1 moles of a saturated aliphatic free glycol containing four to 10 carbon atoms and having hydroxyl groups on its terminal carbon atoms, e.g., 1,4-butane diol and 1,10-decane diol. Such polyether urethanes have molecular weights in excess of 10,000.

An example of such a polyether urethane is the product made from 0.11 moles of Dow Chemical's Voranol P-2,000, which is a dihydric polypropylene glycol, having a molecular weight of about 2,000 and a hydroxyl number of about 56.3, with 0.20 moles of 4,4'-diphenyl methane diisocyanate (molecular weight 250) and 0.09 moles of 1,4-butanediol. The polymer is prepared by melting the diisocyanate, under a nitrogen blanket, at 50° C. and slowly adding the Voranol over a period of 3 hours, while maintaining the exotherm temperature below 50° C., to form an isocyanate terminated prepolymer. The 1,4-butanediol, which serves as chain extender, is then added, and the reaction temperature increased slowly to about 120° C. by the end of the run. After approximately 4 hours, an essentially linear polyether urethane, having a molecular weight in excess of 20,000 is formed. There can similarly be employed polyether urethanes prepared from polyalkylene oxides plus glycols and diisocyanates of the type shown in Schollenberger U.S. Pat. No. 2,899,411.

Typical suitable commercial polyurethanes include Texin 480A, which is made from glycol adipate polyester, propylene glycol adipate polyester, naphthalene 1,5-diisocyanate, butanediol-1,4 and esterified montan wax as described in Muller U.S. Pat. No. 2,729,618, Estane 5702 (formerly called Estane 5704X2) having a molecular weight of about 30,000 and made from hydroxyl poly (tetramethylene adipate), butanediol-1,4 and diphenyl methane-p,p'-diisocyanate and having the following physical properties:

| Specific Gravity | 1.19 |
| Shore Hardness | 70 A |
| Tensile Strength | 5300 psi |
| 300% Modulus | 450 psi |
| Ultimate Elongation | 710% |

Estane 5701 is made from the same starting materials as Estane 5702 and has a higher molecular weight but has higher modulus and hardness properties. Thus the properties of Estane 5701 are

| Specific Gravity | 1.19 |
| Shore Hardness | 88 A |
| Tensile strength | 8900 psi |
| 300% Modulus | 1820 psi |
| Ultimate Elongation | 590% |

As previously pointed out, the thermoplastic polymer film or sheet, preferably of a polyurethane or vinyl chloride polymer, has dispersed therethrough numerous particles of a hydrophilic acrylate or methacrylate. The thermoplastic sheet having the hydrophilic acrylate or methacrylate particles can be sold as such for later application to a non-woven or woven fabric in making the leather substitute. Usually, however, it will be laminated to the fabric with the aid of sufficient heat to render the sheet or fabric or both adhesive. Thus, the woven and non-woven fabric substrates can be made of fibers such as cotton, cellulose acetate, viscose rayon, cellulose acetate-propionate, wool, polyester, e.g. polyethylene terephthalate, polyamides, e.g. polyhexamethylene adipamide (nylon 6,6) or poly epsilon caprolactam (nylon 6), hemp, modacrylic, e.g. acrylonitrile-vinyl chloride (85:15), polyacrylonitrile, polyvinyl alcohol, glass, polyesteramides, monoolefin polymers, e.g. polypropylene, polyurethane, rubber, etc. e.g.

The fabric substrates can be woven twills, drills and ducks; jersey, tricot and simpler knitted materials; and felts; needle-punched batts, and batts impregnated with synthetic resins and rubbers. The fibers of the substrate can be natural or synthetic, crimped or straight, organic or inorganic, continuous filament or staple, or a papermaking length. Mixed fabrics can be used, e.g. a mixture of polyethylene terephthalate and cotton (such as 65:35, 50:50 or 35:65).

Particularly valuable substrates are fabrics which are impregnated with the hydrophilic acrylate or methacrylate polymers. Thus, non-wicking fabrics can be converted to wicking fabrics. For example, when Quox (a non-woven polyethylene terephthalate fabric) is sprayed with a 30 percent solution of 2-hydroxyethyl methacrylate polymer in methanol, the initially non-wicking fabric becomes wicking. Other solvents can be used such as, 95 percent ethyl alcohol, isopropyl alcohol, ethylene glycol, di-ethylene glycol monomethyl ether, etc.

Polyethylene terephthalate fabrics such as Quox after hot pressing stop the passage of moisture. When the fabric or felt having impregnated therein the hydrophilic acrylate or methacrylate polymers according to present invention is hot pressed such as in the laminating operation, substrate breathing of the polyethylene terephthalate is thereby permitted.

Lamination of the thermoplastic sheet containing the dispersed hydrophilic acrylate or methacrylate polymer particles to the fibrous substrate can be accomplished in any convenient manner, e.g. by passing through heated pressure rolls or by employing a press. Preferably, a pressure of 60 to 200 psi is employed, although higher or lower pressures, above atmospheric, can be used. The heating need only be enough to soften the thermoplastic sheet and preferably is not over 270° F. Thus, a suitable temperature and pressure combination for laminating a 10 mil polyurethane film containing 2-hydroxyethyl methacrylate polymer particles dispersed therethrough to Quox or 13 mil thick canvas is 270° F. and 166 psi.

The lamination process seals off the 2-hydroxy-ethyl methacrylate polymer particles and as a result the moisture vapor transmission rate (MVTR) is reduced. The moisture vapor transmission rate is then brought back by heating, e.g. at atmospheric pressure, or preferably in a vacuum, e.g. 1 to 200 mm. at a temperature of 275° F. to 400° F. until the hydrophilic polymer particles are converted to swollen beads. This is accomplished for example by heating at 325° F. for 5 minutes at 10 mm. or heating at 350° F. for 3 minutes at 10 mm. Temperatures above 400° F. are not preferred because above this temperature, the hydrophilic polymer begins to depolymerize. The heating just described brings back the MVTR properties temporarily lost at least in part by the lamination step.

To provide a suede-type finish to the artificial leather, the beaded surface is run through a sander to break the beads and provide the suede-like finish.

120 grit size abrasive particles are employed in the sander for a fine antelope-type finish, while 180 grit is used for an even finer, smoother finish. A coarser surface is provided by using 40 grit abrasive particles in the sander.

It will be appreciated that if the initial particles of hydrophilic polymer in the thermoplastic sheet are of irregular shape that the swollen beaded particles resulting from the heating step will also be irregular in shape. Of course, if the initial particles are of spherical shape, then the swollen beads will also be spherical.

The artificial leather as prepared above can be dyed with any convenient pigment. Thus there can be used Geigy Irgacet black in a 50:50 methanol-isopropanol to form a calf by dyeing the suede. If the solvent has a tendency to dissolve the hydrophilic polymer, a gloss is imparted to the synthetic leather.

The invention will be understood best in connection with the drawings wherein

Figure 1:
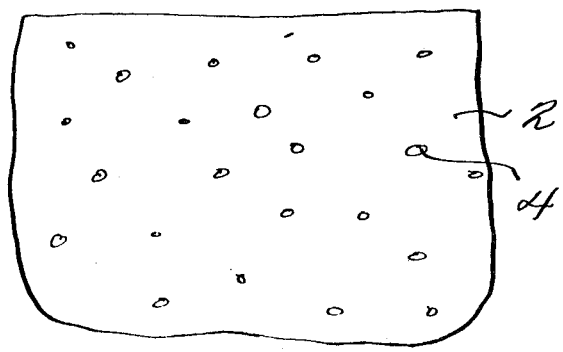
FIG. 1 is a fragmentary plan view of a sheet of polymer according to the invention.

Referring more specifically to the drawings, there is shown in FIG. 1 a calendered sheet of polyurethane 2 having dispersed therethrough, swollen particles or beads 4 of hydrophilic 2-hydroxyethyl methacrylate polymer. The size of the swollen hydrophilic polymer particles is greatly exaggerated. FIG. 1 is a view of the sheet after heating to swell the hydrophilic polymer.

Figure 2:
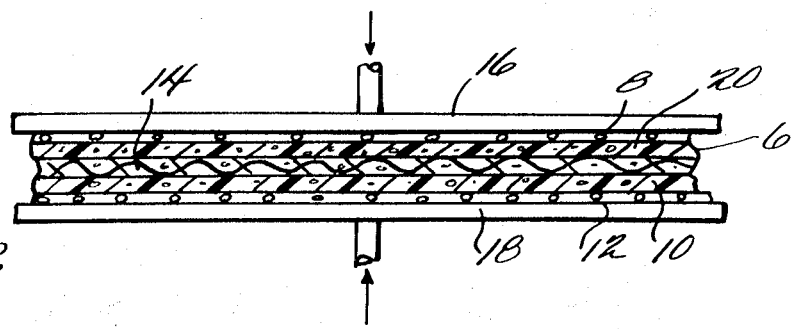
FIG. 2 is a vertical view partially in cross section, illustrating the laminating step.

As shown in FIG. 2, an upper calendered polyvinyl chloride sheet 6, having particles 8 of hydrophilic 2-hydroxypropyl methacrylate polymer dispersed therethrough and a similar lower calendered polyvinyl chloride sheet 10 having particles 12 of the hydrophilic 2-hydroxypropyl methacrylate polymer dispersed therethrough, are laminated to a non-woven polyethylene terephthalate fabric 14 in a heated press having upper platen 16 and lower platen 18. The fabric 14 had previously been sprayed with a solution of 2-hydroxyethyl methacrylate polymer in isopropanol-methanol and the solvent evaporated. The hydrophilic polymer coating on the fabric 14 is indicated by the particles 20. FIG. 2 is a view taken prior to the heating to swell the particles 8 and 12 in the sheets 6 and 10.

Figure 3:
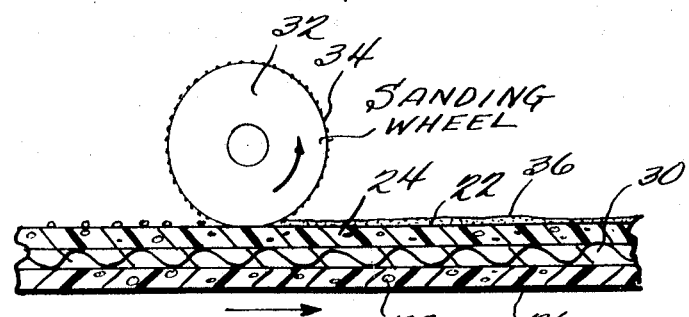
FIG. 3 is a vertical view, partially in cross section, illustrating the sanding step.

As shown in FIG. 3, a laminate of an upper polyurethane sheet 22 having swollen 2-hydroxyethyl acrylate particles 24 dispersed therethrough, a similar lower polyurethane sheet 26 having swollen 2-hydroxyethyl acrylate particles 28 united to an intermediate layer of canvas 30 is passed in the direction of the arrow under a sanding wheel 32 having 120 grit abrasive particles 34 on the periphery thereof. As a result, the upper layer of hydrophilic polymer particles is broken to give a suede-like appearance as shown at 36 after passing under the wheel.

Figure 4:
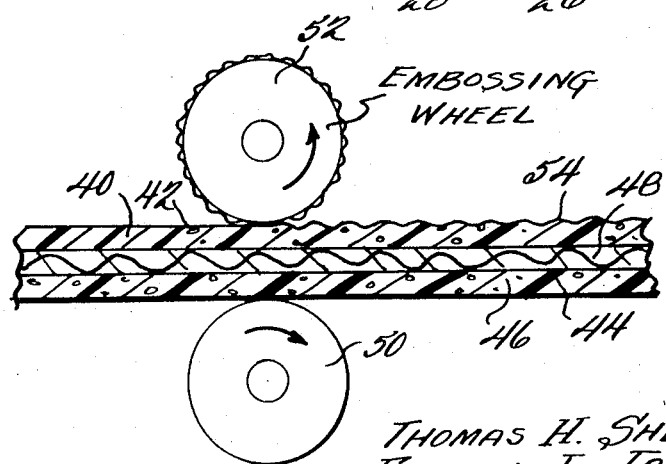
FIG. 4 is a vertical view, partially in cross section, illustrating one method of embossing.

FIG. 4 illustrates one method of embossing the upper surface of a laminate. Thus a laminate of an upper sheet 40, containing 50 percent polyurethane and 50 percent polyvinyl chloride having particles 42 of 2-hydroxyethyl methacrylate polymer dispersed therethrough, a lower sheet 44 of the same polyurethane-polyvinyl chloride mixture having particles 46 of the hydrophilic 2-hydroxyethyl methacrylate polymer and an intermediate Celanese White non-woven, felt layer 48 is passed between lower roll 50 and embossing roll 52 to provide an embossed design as shown at 54 on the upper surface of sheet 40.

EXAMPLE 1

Into a flask equipped with an agitator and a heating mantle was charged 1,000 grams of silicone oil (polydimethyl silicone), 100 grams of 2-hydroxyethyl methacrylate and 0.33 grams of isopropyl percarbonate. The flask was placed under a nitrogen atmosphere and the contents were rapidly agitated and heated to 100° C. After 15 minutes at 100° C., the polymer slurry obtained was filtered hot to isolate the polymer. The polymer powder was reslurried in 300 ml. of xylene, filtered and dried. A 98 percent yield of 2 to 5 micron particle size powder was obtained.

EXAMPLE 2

Example 1 was repeated using xylene in place of the silicone oil. The amount of 2-hydroxyethyl methacrylate was increased from 100 grams to 300 grams and the quantity of isopropyl percarbonate was increased to 0.99 gram. An 85 percent yield of polymer beads was obtained.

EXAMPLE 3

Example 1 was repeated using mineral oil in place of the silicone oil, the amount of 2-hydroxyethyl methacrylate was increased from 100 grams to 200 grams and the quantity of isopropyl percarbonate was increased from 0.33 to 0.66 gram. A 98 percent yield of polymer beads ranging in diameter from 2 to 5 microns was obtained.

EXAMPLE 4

800 grams of ethylene glycol monomethyl ether, 180 grams of 2-hydroxyethyl methacrylate, 20 grams of acrylic acid and 2 grams of t-butyl peroctoate were charged into a flask. The solution was heated and stirred under a carbon dioxide atmosphere at 85° C. for 6 hours. The thermoplastic hydrophylic polymer formed was precipitated by pouring the reaction solution into 10 liters of rapidly agitated water. The precipitated polymer was isolated by filtration and dried. The product of this example while thermoplastic and solvent soluble has the capability of curing to cross-linked solvent insoluble polymer by further heating, particularly if additional catalyst is added. In contrast, the polymers of Examples 1, 2 and 3 are permanently thermoplastic and solvent soluble. The copolymers formed in Examples 6–11 are all cross-linked.

EXAMPLE 5

The procedure of Example 1 was repeated, replacing the 2-hydroxyethyl methacrylate by 100 grams of 2-hydroxypropyl methacrylate to produce a thermoplastic solvent soluble hydrophilic finely divided bead polymer.

EXAMPLE 6

One hundred grams of purified 2-hydroxyethyl methacrylate was mixed with 0.2 grams of ethylene glycol dimethacrylate and 1 gram of benzoyl peroxide. The mixture was sprayed via a nozzle which forms fine droplets into a chamber containing nitrogen at 150° C. After spraying of the monomer was concluded, 36 grams of polymer beads were recovered.

EXAMPLE 7

An aqueous solution was prepared from 3 percent acrylamide, 22 percent ethylene glycol monomethacrylate, 0.1 percent ethylene glycol dimethacrylate and the balance water. One liter of this solution was mixed with 10 ml. of an aqueous 2 percent solution of sodium thiosulfate and 15 ml. of an aqueous 2 percent solution of ammonium persulfate and the mixture allowed to polymerize at room temperature. The resulting gel was then finely divided to give a cross-linked hydrophilic polymer.

EXAMPLE 8

A polymerization mixture was prepared from 15 parts methacrylamide, 80 parts ethylene glycol monomethacrylate, 0.4 parts ethylene glycol bis-methacrylate and 5 parts of dibenzoyl peroxide. The mixture was rotated at 400 r.p.m. in a helium atmosphere at 80° C. for 6 hours to give a cross-linked copolymer. The polymer was then finely divided (below 100 mesh).

EXAMPLE 9

Ninety seven parts of ethylene glycol monomethacrylate, 0.25 part ethylene glycol bis-methacrylate, 0.25 part diethylene glycol bis-methacrylate, 2 parts ethylene glycol and 0.2 part diisopropyl percarbonate were rotated 80 minutes at 420 r.p.m. in a carbon dioxide atmosphere at 60° C. to produce a hydrophilic copolymer. The polymer was then finely divided, i.e. to less than 100 mesh.

EXAMPLE 10

Fifteen parts of a monomer mixture consisting of 99.7 percent ethylene glycol monomethacrylate and 0.3 percent ethylene glycol bis-methacrylate as a cross-linking agent, 85 parts glycerol and 0.1 part diethyl percarbonate as a catalyst was heated at 65° C. for 20 minutes to form a hydrophilic polymer.

EXAMPLE 11

Fifty ml. of a mixture of 98 percent ethylene glycol monomethacrylate, 0.3 percent diethylene glycol bis-methacrylate and 1 percent ethylene glycol were mixed with 50 ml. formamide and an amount of azo-bis-isobutyronitrile corresponding to 0.2 percent of the combined monomers. Polymerization was performed at 75° C. for 50 minutes to give a hydrophilic polymer.

EXAMPLE 12

In a 1.5 liter reaction flask equipped with a timer, electric heater and a nitrogen inlet tube was charged 800 grams of ethylene glycol monomethyl ether, 180 grams of 2-hydroxyethyl methacrylate, 20 grams of acrylic acid and 2 grams to $t$-butyl peroctoate. The solution was heated and stirred under a carbon dioxide atmosphere at 85° C. for 6 hours. The polymer formed was precipitated by pouring the reaction solution into 10 liters of rapidly agitated water. The precipitated polymer was isolated by filtration and dried. A yield of 185 grams was obtained. The polymer was soluble in ethylene glycol monomethyl ether-methyl ethyl ketone (2:1).

EXAMPLE 13

Eight hundred grams of ethylene glycol monomethyl ether, 180 grams of hydroxyethyl methacrylate, 20 grams of itaconic acid and 2 grams of $t$-butyl peroctoate were charged into a 1.5 liter reaction flask equipped with a stirrer, electric heating and a nitrogen inlet tube. The solution was heated and stirred under a nitrogen atmosphere at 85° C. for 6 hours. The polymer was precipitated by pouring the reactive solution into 10 liters of rapidly agitated water. The precipitated copolymer was isolated by filtration and dried. A yield of 185 grams was obtained. The polymer was soluble in ethyl alcohol-Methyl Cellosolve (3:1).

EXAMPLE 14

Example 1 was repeated, replacing the 2-hydroxy-ethyl methacrylate by 100 grams of 2-hydroxyethyl acrylate to obtain a similar yield of hydrophilic polymer beads.

EXAMPLE 15

The polyethylene glycol monoacrylate and diacrylate copolymer prepared as a block in Wichterle U.S. Pat. No. 3,220,960, Example VI, was ground to a particle size of 100 mesh and was then suitable for use in the present invention.

The above examples illustrate hydrophilic polymers suitable for use in the present invention. As previously indicated, the uncross-linked polymers, such as those of Examples 1, 2, 3, 4, 5, and 14, are preferred since they impart much superior moisture vapor transmission rates to the synthetic leather.

EXAMPLE 16

One hundred parts of the finely divided 2-hydroxyethyl methacrylate polymer prepared in Example 1 was milled with a mixture of 50 parts of Estane 5,702 and 50 parts of Estane 5,701 (100 parts of polyurethane in all) and calendered to form a 10 mil sheet. This sheet was laminated to a 13 mil canvas woven fabric in a press at 270° F. and 166 psi. The laminate was then heated at 325° F. for 5 minutes under a vacuum of 10 mm. This formed swollen beads of hydrophilic polymer on the surface of the polyurethane sheet. The beaded surface was then run through a 120 grit sander to provide a suede-like finish.

EXAMPLE 17

A non-woven fabric (15 mils) composed of polyethylene terephthalate fibers was used as an interlayer by putting it in a press and applying to one side of the fabric a 10 mil calendered sheet of 50 parts Estane 5,701, 50 parts Estane 5,702 and 100 parts of Hydron S (the 2-hydroxyethyl methacrylate polymer prepared in Example 1) and applying to the other side of the fabric two 10 mil calendered sheets of the same Estane 5,701, Estane 5,702 and Hydron S mixture. Pressing was at 175 psi and a temperature of 250° F. The laminate thus prepared was then heated to 350° F. for 3 minutes to develop swollen beads. Both surfaces of the laminate were then run through a 180 grit sander to break the beaded surfaces and provide fine suede-like finishes thereon.

EXAMPLE 18

The procedure of Example 17 was repeated but the Estane 5,701 and Estane 5,702 were replaced by 100 parts of plasticized vinyl chloride polymer (65 parts polyvinyl chloride and 35 parts di 2-ethylhexyl phthalate) so that the 10 mil calendered sheets contained equal parts of Hydron S and plasticized polyvinyl chloride. A similar product was obtained.

EXAMPLE 19

The procedure of Example 16 was repeated but replacing the Estane 5,701 and Estane 5,702 by 100 parts of plasticized polyvinyl chloride (60 parts polyvinyl chloride and 40 parts tricresyl phosphate) to obtain a similar product.

EXAMPLE 20

A 10 mil calendered sheet composed of 100 parts of polyurethane (Estane 5,701 and Estane 5,702 in equal amounts) and 100 parts of Hydron S was placed on top of an 8 mil polyethylene terephthalate woven cloth, a 5 mil calendered sheet of the polyurethane Hydron S placed under the polyester cloth as an adhesive and a 30 mil thick, non-woven felt of polyethylene fibers placed under the 5 mil calendered sheet. The composite product was then pressed under 165 psi at 265° F. to compress the felt and render the Estane sheets adhesive to form a laminate. The resulting product was then heated for 4 minutes at 325° F. and 10 mm pressure. The laminate was next run through a 120 grit sander to impart a suede finish to the uppermost sheet.

EXAMPLE 21

The procedure of Example 16 was repeated but the Estane 5,701 was replaced by 50 parts of plasticized polyvinyl chloride (polyvinyl chloride-dioctyl phthalate 2:1) to produce an artificial leather.

The products obtained in all of Examples 16–21 had excellent moisture vapor transmission properties, comparable to that of Corfam.

EXAMPLE 22

A 10 mil thick polyvinyl chloride plastisol, containing 50 parts of polyvinyl chloride, 50 parts of 2-ethyl hexyl phthalate and 80 parts of 100 mesh particles of Hydron S dispersed therethrough, was placed on a paper having a predetermined design. A cotton felt was placed over the plastisol. The ensemble was then heated at 350° F. until the plastisol had fluxed. The laminate of cotton felt to fluxed plastisol was stripped off the paper to give a product having a design embossed thereon. The product had good moisture vapor transmission properties.

EXAMPLE 23

A binder composition was made from 1,00 parts of polyvinyl chloride (Geon 121), 40 parts of di (2-ethylhexyl) phthalate (a solvent and plasticizer for the polyvinyl chloride), 10 parts of di (2-ethylhexyl) adipate (a solvent and plasticizer for the polyvinyl chloride), 5 parts of di (isodecyl) phthalate (a solvent and plasticizer for the polyvinyl chloride), 5 parts of epoxidized soybean oil (Drapex 4.4, a stabilizer), 5 parts of epoxidized soybean oil, molecular weight 1,000(Paraplex G–62), 3 parts of barium cadmium lauratezinc phenolate complex (Mark M), 2 parts of triphenyl phosphite (Mark PL), 2 parts of the half ester of methyl alcohol with the acids obtained by oxidizing oleic acid, 1 part of water, 1 part of polyethylene glycol molecular weight 400 mono laurate, 10 parts titanium dioxide (rutile, Titanox RA) and 2 parts of antimony trioxide (flame proofing agent).

To 100 parts of the above mixture, there were slowly added 50 parts of the 2-hydroxyethyl methacrylate polymer particles prepared in Example 1. The mass was triturated and allowed to rest for 15 minutes for maturation.

The composition was then coated with the aid of a Baker applicator, onto a casting paper having a "Seton" grain embossing. The coating had a wet thickness of 10 mils. A non-woven substrate, specifically polyethylene terephthalate, was pressed lightly onto the thus coated paper. The assembly was heated at 325° F. for 4 minutes (times of 3 and 5 minutes can also be used) and rolled with pressure (about 165 psi) when still very hot. After cooling the substrate was removed with its coating composition.

The sample produced had the same moisture vapor transmission as the substituted leather made in accordance with Holden U.S. Pat. No. 3,208,875, namely 0.8 grams in Twing-Albert Vapometer, water in the cup, desiccant outside, per 24 hours.

The product had transpiration. It permitted the passage of cigarette smoke from either side, but more easily from the substrate out, which is the way a shoe is worn. Known leather substitutes do not have this attribute, although all of them like the product of Example 23, have waterproofness and flexibility.

When known leather substitutes are subjected to mild abrasion so that the top 0.5 to 1 mil of the surface lacquer is removed, the plastic material below will allow liquid water to leak through as easily as it would through felt or a sponge. They are not cohesive unitary compositions. In contrast, the Hydron S compositions of the present invention, including that of Example 23, are unitary, cohesive, require no lacquer and do not suffer from the disadvantage of leaking when the surface lacquer is removed.

Hydron S-containing product of Example 23 resisted pressure while hot to the extent that it retained its moisture vapor transmission and its smoke permeability. In contrast, known leather substitutes when pressed, lose all their moisture vapor transmission since they are fine-pored sponges which, when compacted, have no more permeability to moisture vapor. One such known leather substitute has a top 1 mil layer of lacquer, a 5 mil layer of fine sponge and then another layer of 10 mils of sponge which is partially penetrated by the fibers of the substrate. The two layers can easily be separated by wetting in acetone for 30 seconds. In contrast, the Hydron S composition cannot be separated by acetone since it was cast as one film. The product of the present invention as illustrated by Example 23 is also less costly to produce than known leather substitutes (about one-seventh the cost). The reason for this is at least in part due to the complexities in the techniques required to manufacture known leather substitutes.

EXAMPLE 24

The procedure of Example 23 was repeated using 1.32 sateen cloth as the substrate. The product was similar to that obtained in Example 23 and was suitable for manufacturing shoe uppers.

EXAMPLE 25

A binder composition was made from 200 parts polyvinyl chloride, 15 parts of a 15 percent dispersion of carbon black in di-(2-ethylhexyl) phthalate, 63 parts of di-(2ethylhexyl) phthalate, 10 parts of di (isodecyl) phthalate, 10 parts of epoxidized soybean oil (Drapex 4.4), 10 parts of octyl epoxystearate (Drapex 3.2), Mark KCB (a barium, cadmium and zinc laurate and aryl phosphite stabilizer), 4 parts of polyethylene glycol 400 monolaurate and 10 parts of Paraplex G–25 (a polysebacate, average mol. wt. 8,000, sp. gr. (25° C./15° C.) 1.06, viscosity (100 percent, 25° C.) 1,700 poises, refractive index ($N^D 25°$) 1.470, freezing point 13°–15° C.)

To 200 parts of the above mixture, there were slowly added 100 parts of the 2-hydroxyethyl methacrylate polymer particles prepared in Example 1. The plastisol mass thus formed was then cast as a 10 mil film on release paper with a "Seton" grain. The plastisol, while still wet, was then plied with the gray Quox, non-woven polyethylene terephthalate substrate. The assembly was then placed in an oven without restriction and heated for 5 minutes at 335° F. The Quox with the coating was removed from the casting paper after it had all cooled down to room temperature. The leather substitute thus prepared was breathable and had the same moisture vapor transmission as known leather substitutes. Normally black material, due in part to its carbon black content, is difficult to make into a poromeric breathable product. Black Corfam has a thin 0.1 mil film of lacquer over a bluish-white plastic material. Hence, abrasion is disfiguring to the appearance of Corfam, but, in contrast, is not disfiguring to the synthetic leather of the present invention such as that prepared in Example 25, for example.

EXAMPLE 26

The procedure of Example 25 was repeated but using a polyethylene terephthalate felt as the substrate. The leather-like product had good moisture vapor transmission, was permeable to cigarette smoke, was waterproof and abrasion resistant. In contrast, a control which omitted the Hydron S, while giving a good leather-like coating, had no moisture vapor transmission. The polyethylene terephthalate felt was a superior substrate to the Quox and created fewer surface imperfections.

EXAMPLE 27

A mixture of 100 parts of Estane 5,701, 100 parts of Estane 5,702, 200 parts of Hydron S particles (prepared as set forth in Example 1) and 20 parts of a 15 percent paste of carbon black in dioctyl phthalate was calendered to form a 10 mil film of the polyurethane containing the hydrophilic methacrylate polymer particles dispersed therethrough. The film was laminated by heat and pressure alone (325° F. and 165 psi) to Quox. The product had a smooth surface and the grain was that of "High-Finish Calf."

EXAMPLE 28

A mixture of 50 parts of Estane 5,701, 50 parts Estane 5,702, 100 parts of Hydron S particles (prepared as set forth in Example 1), and 10 parts of a 15 percent dispersion of carbon black in dioctyl phthalate were calendered at 280° F. to form a 10 mil sheet. The sheet was laminated to cotton canvas shoe fabric at 280° F. and 170 psi. On treating at 350° F., for 5 minutes, little glass-like beads grew out of the surface. They were perfectly spherical and reflected light. The moisture vapor transmission of the artificial leather thus prepared was equal to that of a known leather substitute.

Upon abrading the beaded material by passing it through a 120 grit sander, a true leather-like suede was produced. Using rougher abrasion, e.g. larger grit particles, produces a higher pile. The suede product also had moisture vapor transmission equal to that of known synthetic leather.

EXAMPLE 29

Various materials were tested for use with Estane 5,702 in making synthetic leather and then tested for moisture vapor transmission. The procedure was to calender the Estane 5,702 resin and additive to form a 10 mil skin and then laminate this skin to Quox (non-woven shoe substrate) and measure the moisture vapor transmission of the laminate over a period of 24 hours. A known leather substitute was run as a control and had a moisture vapor transmission of 0.75.

Hydron S also showed a MVT of 0.75 when used at 50 or 100 parts per 100 parts of resin (Estane 5,702). In contrast, polyvinyl methyl ether-maleic anhydride copolymer at 50 parts per 100 of resin showed an MVT of 0.1; corn dextrin at 50 parts per 100 parts of resin showed an MVT of 0.05; polyethylene oxide polymer at 50 parts per 100 parts of resin showed an MVT of 0.25; algin (Kelcosol) at 50 parts per 100 parts of resin showed an MVT of 0.25; polyvinyl alcohol at 50 parts per 100 parts of resin (both at 98 and 99.5 percent polyvinyl alcohol content) was ineffective for MVT; water glass gel at 50 and 100 parts per 100 parts of resin was ineffective; freeze dried cellulose xanthate at 50 parts per 100 parts of resin was ineffective for MVT. The Estane 5,702 by itself (no additive) has a MVT of 0.00.

In overall properties, the Hydron S (prepared as set forth in Example 1) was about 5 times as good as the best substitute when used at 50 parts per 100 parts of resin. The cross-linked hydrophilic methacrylate polymer of Example 13, at 50 parts per 100 parts of resin, was about twice as good as the best other material tested. In breathability and moisture vapor transmission, none of the materials tested as modifiers for the Estane 5,702 were in any way comparable to the Hydron S.

The composition was intimately mixed. Internally generated heat dissolved the curative. The warm pourable mass was spread onto a teflon coated casting sheet to a thickness of 10 mils wet. Cotton fabric 80 × 80 was pressed onto the surface and adhered adequately to the wet sticky composition. The coating cured overnight on the laboratory bench. The laminate was then removed from the casting sheet. The M.V.T. was 0.5, or 25 times greater than the control Adiprene composition without any Hydron S. To improve the pot-life of the composition, a solvent was added, namely 25 parts of cellusolve acetate (urethane grade). The composition was easily mixed without any heating up, was fluid and had a pot-life of 2 hours.

EXAMPLE 30

A pourable composition was made with the ingredients of Example 27, by dissolving the 10 mil film in dimethyl formamide to yield a solution at 10 percent solids. This solution was knife-coated onto 80 × 80 balloon cloth. Ten coats were applied with drying between coats. A total film thickness of 0.005 inch was deposited on the cloth. The surface was very smooth and the composite had a M.V.T. of 0.5.

EXAMPLE 31

A pourable, curable composition with a polyurethane binder was made according to the following formula:

| | |
|---|---|
| Adiprene L 167 | 100 grams |
| Methyl-o-chlor-aniline (Curing agent) | 11 grams |
| Carbon black (15% dispersion in Adiprene L 167) | 10 grams |
| Hydron S | 100 grams. |

Adiprene is the trade mark (duPont) of an isocyanate terminated polyether prepolymer which is fluid and pourable. Adiprene L 167 is a liquid poly (1,4-oxybutylene) glycol having terminal tolylene diisocyanate groups (see Saunders et al., Polyurethanes Part II, 1964 pages 341, 352, 353 and 857, and Dombrow Polyurethanes, Second edition, 1965, pages 149, 150, 152).

What is claimed:

1. A flexible thermoplastic polymer matrix in film or sheet form having dispersed therethrough small particles of a hydrophilic, thermoplastic, water-insoluble, organic solvent soluble polymer of a member of the group consisting of hydroxy lower alkyl acrylates, hydroxy lower alkyl methacrylates, hydroxy lower alkoxy lower alkyl acrylates and hydroxy lower alkoxy lower alkyl methacrylates.

2. A leather substitute comprising a matrix according to claim 1 laminated to a woven or non-woven fabric impregnated with a hydrophilic water-insoluble, solvent soluble acrylate or methacrylate polymer of a member of the group consisting of hydroxy lower alkyl acrylates, hydroxy lower alkyl methacrylates, hydroxy lower alkoxy lower alkyl acrylates and hydroxy lower alkoxy lower alkyl methacrylates.

3. A leather substitute according to claim 2 wherein the acrylate or methacrylate polymer is a polymer of a member of the group consisting of hydroxyethyl acrylate, hydroxyethyl methacrylate, hydroxypropyl acrylate and hydroxypropyl methacrylate.

4. A matrix according to claim 1 having 40 to 150 parts of said hydrophilic polymer per 100 parts of flexible thermoplastic polymer matrix.

5. A matrix according to claim 1, wherein the acrylate or methacrylate is a polymer of a member of the group consisting of hydroxyethyl acrylate, hydroxyethyl methacrylate, hydroxypropyl acrylate and hydroxypropyl methacrylate.

6. A matrix according to claim 5, wherein the matrix is thermoplastic and is selected from the group consisting of substantially linear polyurethane polymer and polyvinyl chloride.

7. A matrix according to claim 6, wherein the hydrophilic polymer is a polymer of 2-hydroxyethyl methacrylate.

8. A leather substitute comprising a matrix according to claim 1 laminated to a woven or non-woven fabric.

9. A breathable, moisture vapor transmissible leather substitute comprising a flexible thermoplastic matrix according to claim 1 in sheet form, wherein the small particles are in swollen form and the hydrophilic polymer is a solvent soluble polymer of a member of the group consisting of hydroxy lower alkyl acrylates, hydroxy lower alkyl methacrylates, hydroxy lower alkoxy lower alkyl acrylates and hydroxy lower alkoxy lower alkyl methacrylates.

10. A breathable leather substitute according to claim 9, wherein the matrix is selected from the group consisting of substantially linear polyurethane polymer and polyvinyl chloride and the acrylate or methacrylate is a polymer of a member of the group consisting of hydroxyethyl acrylate, hydroxyethyl methacrylate, hydroxypropyl acrylate and hydroxypropyl methacrylate.

11. A leather substitute according to claim 10, wherein the exposed swollen particles have their surfaces broken to give a suede-like feel and appearance.

12. A leather substitute according to claim 11, wherein the sheet is laminated to a woven or non-woven fabric.

13. A leather substitute according to claim 9, wherein the sheet is laminated to a woven or non-woven fabric.

14. A leather substitute according to claim 13, wherein a sheet of said flexible thermoplastic matrix is laminated to both sides of said fabric.

15. A leather substitute comprising a matrix according to claim 1 laminated to a woven or non-woven fabric, the small particles of the hydrophilic polymer being in the form of little, glass-like, light-reflective beads.

16. A product according to claim 15 wherein the matrix is a thermoplastic matrix selected from the group consisting of substantially linear polyurethane polymers and polyvinyl chloride and the acrylate or methacrylate is a polymer of a member of the group consisting of hydroxyethyl acrylate, hydroxyethyl methacrylate, hydroxypropyl acrylate and hydroxypropyl methacrylate.

* * * * *